United States Patent [19]
Kitaura et al.

[11] Patent Number: 5,070,395
[45] Date of Patent: Dec. 3, 1991

[54] TELEVISION SIGNAL SYSTEM CONVERSION APPARATUS

[75] Inventors: Masahiro Kitaura, Nagareyama; Tomoaki Uchida, Noda, both of Japan

[73] Assignee: Victor Company of Japan, Ltd., Yokohama, Japan

[21] Appl. No.: 501,754

[22] Filed: Mar. 30, 1990

[30] Foreign Application Priority Data

Mar. 31, 1989 [JP] Japan .................................. 1-81132

[51] Int. Cl.$^5$ ........................ H04N 7/01; H04N 11/20
[52] U.S. Cl. ...................................... 358/11; 358/140
[58] Field of Search ................................ 358/11, 140

[56] References Cited

FOREIGN PATENT DOCUMENTS

| 233720 | 8/1987 | European Pat. Off. |
| 26383 | 2/1986 | Japan |
| 151887 | 6/1989 | Japan |
| 92184 | 3/1990 | Japan |

OTHER PUBLICATIONS

"MUSE-525 Lines Video Signal Converter" by Y. Izumi et al; 1988.
"MUSE/NTSC Converter" by M. Itoga et al; IEEE Transactions on Consumer Electronics, vol. 35, No. 3, Aug. 1989; pp., 142–150.

*Primary Examiner*—John W. Shepperd
*Attorney, Agent, or Firm*—Pollock, VandeSande & Priddy

[57] ABSTRACT

An apparatus for processing a MUSE system television signal to obtain a converted NTSC system signal which can be displayed by a conventional NTSC receiver, enabling selection of a first mode of operation in which the MUSE signal picture is displayed with right and left side portions removed, to conform to the NTSC aspect ratio, and a second mode in which the entire MUSE signal picture is displayed between upper and lower masking regions.

3 Claims, 12 Drawing Sheets

TELEVISION SIGNAL SYSTEM CONVERSION APPARATUS

BACKGROUND OF THE INVENTION

1. Field of Technology

The present invention relates to an apparatus for converting a television signal which is in accordance with the MUSE (Multiple Sub-Nyquist Sampling Encoding) system to a television signal of the NTSC (National Television Systems Committee) system, for enabling pictures of the MUSE television signal to be displayed by a conventional NTSC standard television receiver.

2. Prior Art Technology

The MUSE television system has been developed in order to enable a high-definition television signal to be bandwidth-compressed to an 8.1 MHz bandwidth MUSE signal, which can be broadcast by transmission via a single satellite channel. The MUSE system is described in detail in "Nikkei Electronics", 1987.11.2, (pages 189 to 212), published by Nikkei McGraw-Hill Co. Since television receivers equipped for high definition television operation are not in wide use at the present time, it is desirable that a MUSE broadcast signal can be applied to a conventional television receiver and displayed. In the following it will be assumed that the conventional television receiver is of the NTSC standard. However the problem arises that there are some basic differences between the MUSE system television signal and the NTSC system signal. In particular, the number of scan lines per frame, the aspect ratio of the television picture, and the method of multiplexing the color signals within the television signal are all significantly different between the MUSE and the NTSC systems. These differences are set out in the following table.

TABLE 1

|  | MUSE | NTSC |
|---|---|---|
| Number of scan lines per frame | 1125 | 525 |
| Effective number of scan lines per frame | 1032 | 483 |
| Aspect ratio | 16:9 | 4:3 |
| Method of color signal multiplexing | Line-sequential TCI method | Chroma signal superimposed on luminance signal |

In the above, "effective number of scan lines" signifies the number of scan lines which contain picture information (as opposed to audio signals, synchronizing signals, etc.).

One method which has been proposed in the prior art for conversion from MUSE to NTSC signal is to use a vertical filter to select ½ of the scan lines of the MUSE signal, to form the scan lines of one frame of the NTSC signal, and to clip off portions at the right and left sides of the display (i.e. to omit the corresponding portions of the luminance data in each scan line of the MUSE signal) to thereby obtain a signal which will provide an aspect ratio of 4:3. The color data of each effective scan line of the MUSE signal (where "effective scan line" has the significance defined hereinabove) are time-expanded (to compensate for a ½ compression of the color data that is executed in forming the MUSE signal, with the compressed color data being inserted into the horizontal blanking intervals of respective scan lines) and then multiplexed with the luminance signal in accordance with the NTSC standard. In the MUSE system, each effective scan line contains either B-Y data for one line, or R-Y data for one line, alternating in successive lines. Thus, each frame contains complete B-Y and R-Y data for only half of the total number of effective scan lines. The basic features of this conversion method are illustrated in FIG. 1, with the C (color signal) and Y (luminance signal) components of one frame of the MUSE signal and a corresponding frame of the NTSC signal being conceptually indicated as display regions. As illustrated, the compressed C component of the MUSE signal is inserted in each scan line before the portion of the scan line which contains the Y component. In effect, the portions of the C and Y signal regions of the MUSE frame that are shown as hatched-line regions are "cut out", the cut-out C region is time-expanded and combined with the cut-out Y region (after selecting ½ of the total number of scan lines of the cut-out Y region, to obtain 483 effective scan lines per frame), to thereby obtain the corresponding NTSC signal region indicated as (Y+C), which will provide a television picture having an aspect ratio of 4:3 and 483 effective scan lines (with a total of 525 scan lines) per frame.

However with such a method of conversion from the MUSE to the NTSC system, the problem arises that in order to obtain the NTSC system picture, relatively large portions are clipped from the right and left sides of the MUSE picture. In many cases, important information or picture detail will be contained in these regions at the right and left sides, so that the viewer will desire to see the entire MUSE system picture, without clipping of the side regions.

SUMMARY OF THE INVENTION

It is an objective of the present invention to overcome the problem of the prior art types of apparatus for conversion from the MUSE to the NTSC system, by providing an apparatus having a simple configuration which enables selection of a conversion mode of operation in which portions of the right and left sides of the MUSE system television picture are cut off to obtain a picture aspect ratio of 4:3 as known in the prior art and described above, and a conversion mode in which the entire MUSE system television picture is displayed, i.e. with an aspect ratio of 16:9, between upper and lower masking regions.

To achieve the above objective, an apparatus according to the present invention comprises:

selector means actuatable for establishing a first mode and a second mode of operation for conversion processing to derive from a MUSE system signal a converted NTSC system signal;

means for executing the conversion processing in the first mode, comprising means for removing fixed-size portions of each scan line of the MUSE signal corresponding to left and right sides of a video picture represented by the MUSE signal and means for thinning out the resulting scan lines of the MUSE signal by a factor of ½ to thereby derive from each frame of the MUSE signal all of the scan lines of a corresponding frame of the converted NTSC signal, whereby the NTSC signal represents the MUSE signal picture with the left and right portions removed and having an NTSC aspect ratio of 4:3; and means for executing the conversion processing in the second mode, comprising means for thinning out the scan lines of the MUSE signal by a factor of ⅓ to thereby obtain from the scan lines of each frame of the NTSC signal a fixed number of the scan lines of a corresponding frame of the converted NTSC signal, and means for generating the remaining scan lines of the corresponding frame by utilizing masking signals, whereby the NTSC signal represents a picture having the NTSC aspect ratio, the picture being formed of the MUSE signal picture having an aspect ratio of 16:9 sandwiched between upper and lower mask regions.

DESCRIPTION OF PREFERRED EMBODIMENTS

Figure 1:
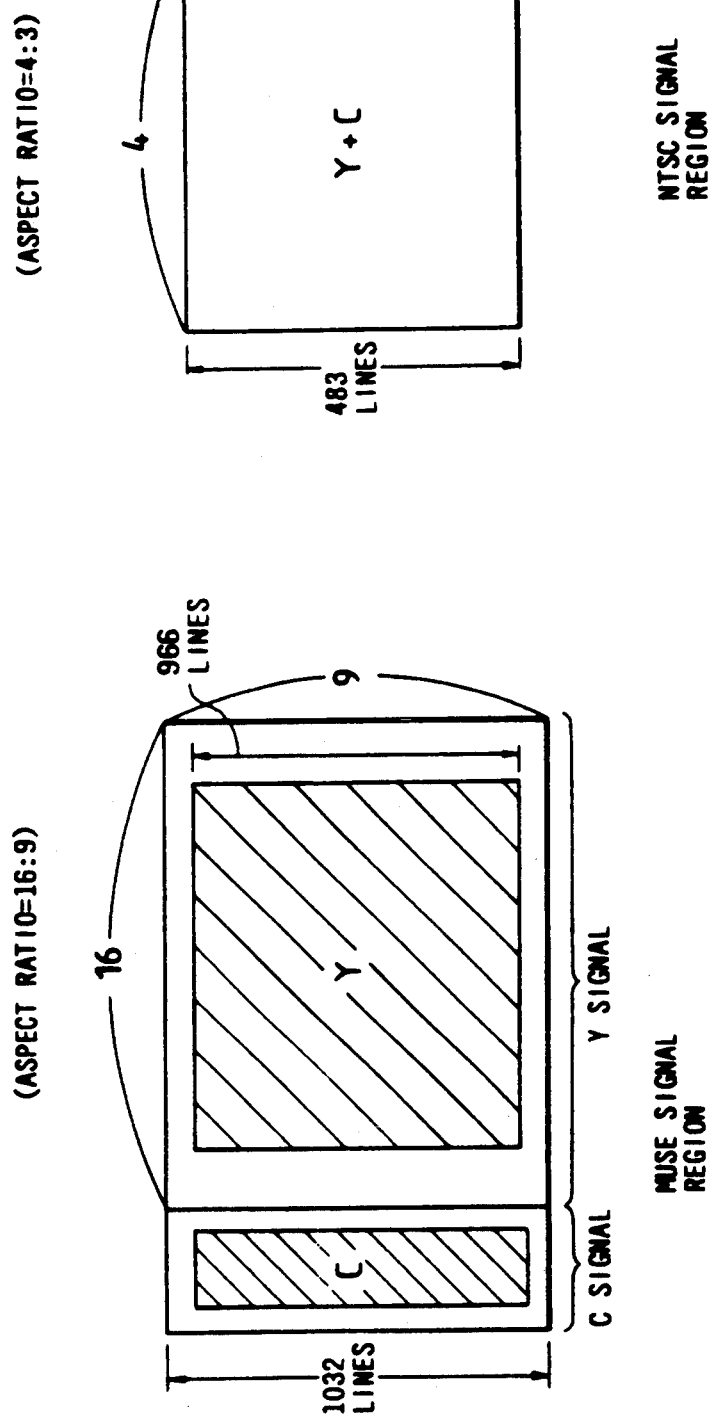
FIGS. 1A and 1B are diagrams for conceptually illustrating a prior art method of modifying the aspect ratio and number of scan lines per frame of a MUSE television system signal to enable display by an NTSC standard television receiver, by clipping portions at the right and left sides of the MUSE television picture.
Figure 2:
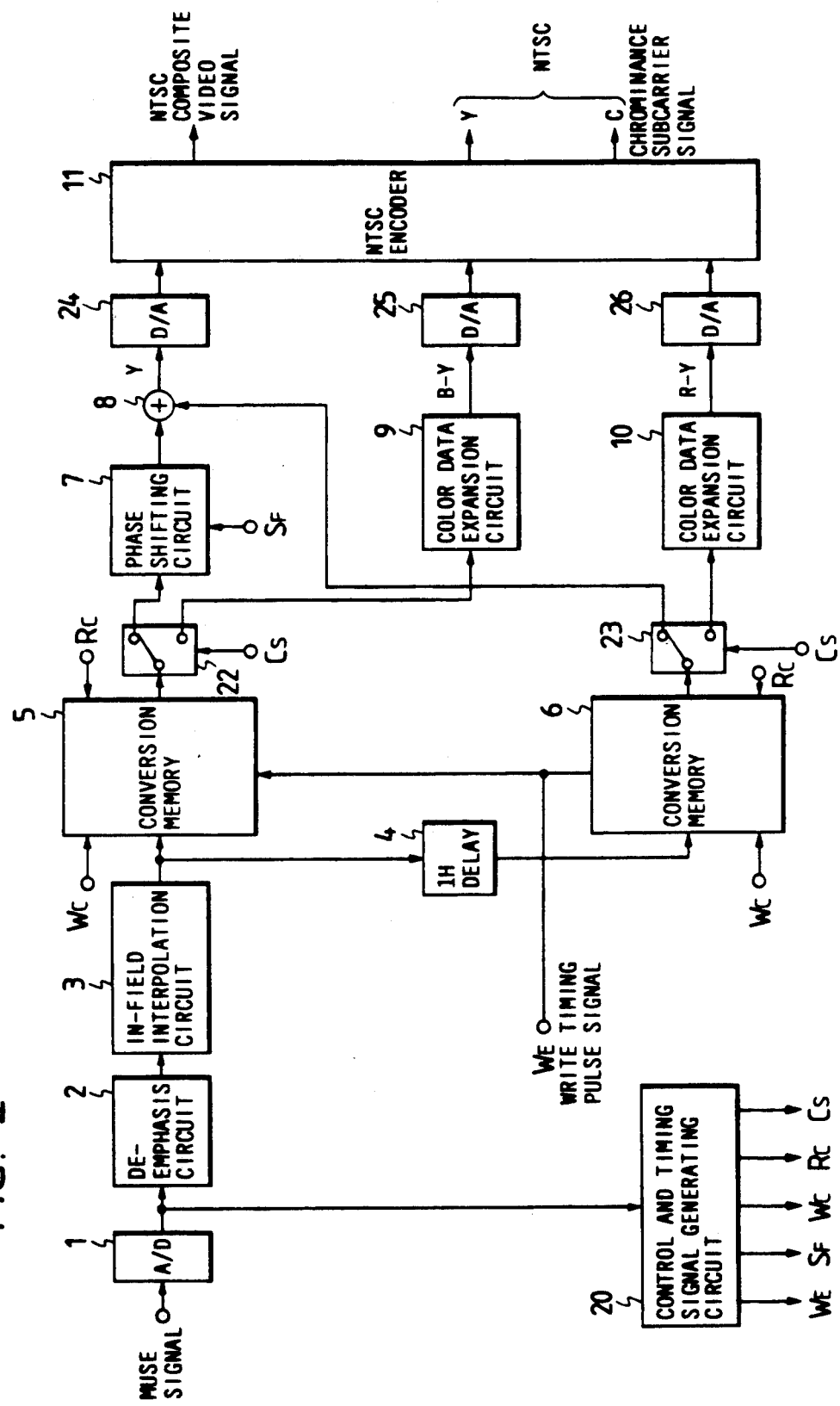
FIG. 2 is a general block diagram of an example of an apparatus for implementing the prior art method of FIG. 1.
Figure 3:
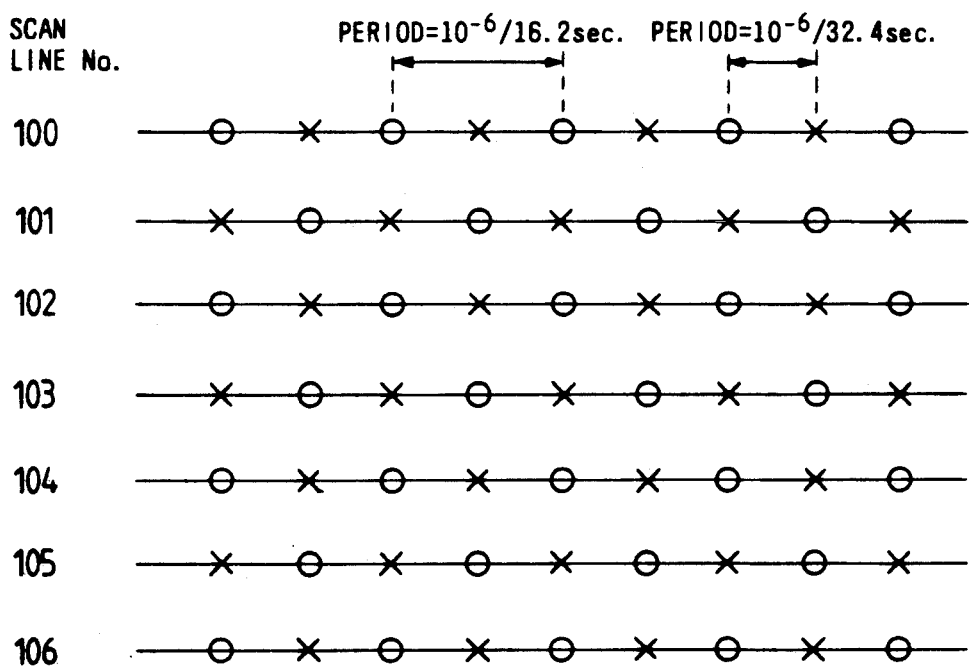
FIG. 3 is a diagram for describing the operation of an in-field interpolation circuit in the apparatus of FIG. 1.

Before describing an embodiment of an apparatus according to the present invention for conversion from the MUSE to the NTSC system, a detailed description will be given referring to FIG. 2 of an apparatus for implementing the prior art method of conversion from the MUSE to the NTSC system described hereinabove referring to FIG. 1, in which the MUSE signal (FIG. 1A) is converted to an NTSC signal (FIG. 1B) such that in the resultant displayed NTSC television signal, portions at the right and left sides of the MUSE television picture are excluded. In FIG. 2 the MUSE signal (which is an analog signal that has been obtained by demodulation of a received frequency-modulation MUSE signal) is inputted to an A/D (analog/digital) converter 1. Each scan line of the MUSE signal is made up of 96 C (color information) samples, followed by 384 Y (luminance information) samples, i.e. the number of C samples in a MUSE signal scan line is ¼ of the number of Y samples in that line. In the MUSE signal format, the C samples of a scan line are compressed into the horizontal blanking interval of that scan line. These Y and C samples are outputted as respective digital values from the A/D converter 1, at a sample rate of 16.2 MHz (i.e. the sample period of the MUSE signal is $10^{-6}/16.2$ sec). The digital samples are then transferred, as parallel 8-bit values, through a de-emphasis circuit 2 to compensate for FM pre-emphasis, and then to an in-field interpolation circuit 3. The function of the in-field interpolation circuit 3 will be described referring to FIG. 3, which illustrates the relationships of Y or C samples in successive scan lines of a field of the MUSE signal. It will be assumed that Y samples are shown, which correspond to respective pixels of the television picture. In FIG. 3, positions of respective samples are indicated by circle symbols, while positions where samples which should be present in a scan line but have been omitted (in forming the MUSE signal) are indicated by "x" symbols. As shown, the samples, i.e. pixels, are successively offset in alternate scan lines. The in-field interpolation circuit 3 functions to derive interpolated sample values for each of these "x" positions and insert these in the respective positions. As a result, since the sample frequency of the input MUSE signal to the in-field interpolation circuit 3 is 16.2 MHz, the sample frequency of the output signal from the in-field interpolation circuit 3 will be twice that, i.e. 32.4 MHz.

Timing and control signals, as well as memory write and read clock signals, are generated by a control and timing signal generating circuit 20, which includes a sync separator circuit for separating the horizontal synchronizing signal component from the output of the A/D converter 1, and a PLL (phase locked loop circuit) which is phase-locked with that horizontal synchronizing component and generates a basic clock signal. The control and timing signal generating circuit further includes frequency dividers for deriving the aforementioned timing, control, and write and read clock signals from that basic clock signal.

The output signal from the in-field interpolation circuit 3 is applied to data input terminals of a conversion memory 5, and through a 1 H delay element 4 (i.e. which produces a delay equal to one horizontal scanning interval of the MUSE signal) to data input terminals of a conversion memory 6. Writing into the conversion memories 5 and 6 is executed simultaneously at timings determined by a write clock signal $W_C$ having a frequency of 32.4 MHz, i.e. at the sample frequency of the output signal from the in-field interpolation circuit 3, described above. Write-in to the conversion memories 5 and 6 is enabled only while a write timing pulse signal $W_E$ is at the "H" (high) logic level, i.e. in that condition, successive data values representing respective C or Y values are simultaneously written into successive addresses of the conversion memories 5 and 6. The write timing pulse signal $W_E$ is also generated from the control and timing signal generating circuit 20.

Read-out from each of the conversion memories 5 and 6 is continuously enabled. Read-out is executed simultaneously from both of conversion memories 5 and 6 in accordance with a read clock signal $R_C$ which is produced from the control and timing signal generating circuit 20. The output data from the memories 5 and 6 are inputted to respective electronic switches 22 and 23, for separation of the C (color) and Y (luminance) samples in each scan line, as described hereinafter. The Y data output from switch 22 are then transferred through a phase shifting circuit 7, which derives one scan line which, in conjunction with an adder 8 forms a vertical filter for deriving a Y signal having, in each frame, $\frac{1}{2}$ of the number of scan lines that are written into the conversion memories 5 and 6 in each frame of the MUSE signal. The output from the phase shifting circuit 7 is applied to one input of the adder 8, and the Y output from the switch 23 is applied to the other input of the adder 8. The C output from the switch 22 (which consists only of the B-Y component of the C data as described hereinafter where B denotes blue and Y denotes luminance) is applied to a color data expansion circuit 9, which executes time-axis expansion of the compressed C data each frame, such as to correct for the aforementioned compression by $\frac{1}{4}$. The C output from the switch 23, which is the R-Y component of the compressed C data (where R denotes red), is similarly expanded in a color data expansion circuit 10. The outputs from each of the adder 8, color data expansion circuit 9 and color data expansion circuit 10 are respectively converted to analog form by D/A converters 24, 25 and 26, whose output signals are inputted to an NTSC encoder circuit 11. In the NTSC encoder circuit 11, the Y, B-Y and R-Y outputs of the D/A converters 24 to 26 are combined to form an NTSC composite color signal. Alternatively, these can be combined to form separate NTSC Y(luminance) and chrominance subcarrier signals.

Figure 4:
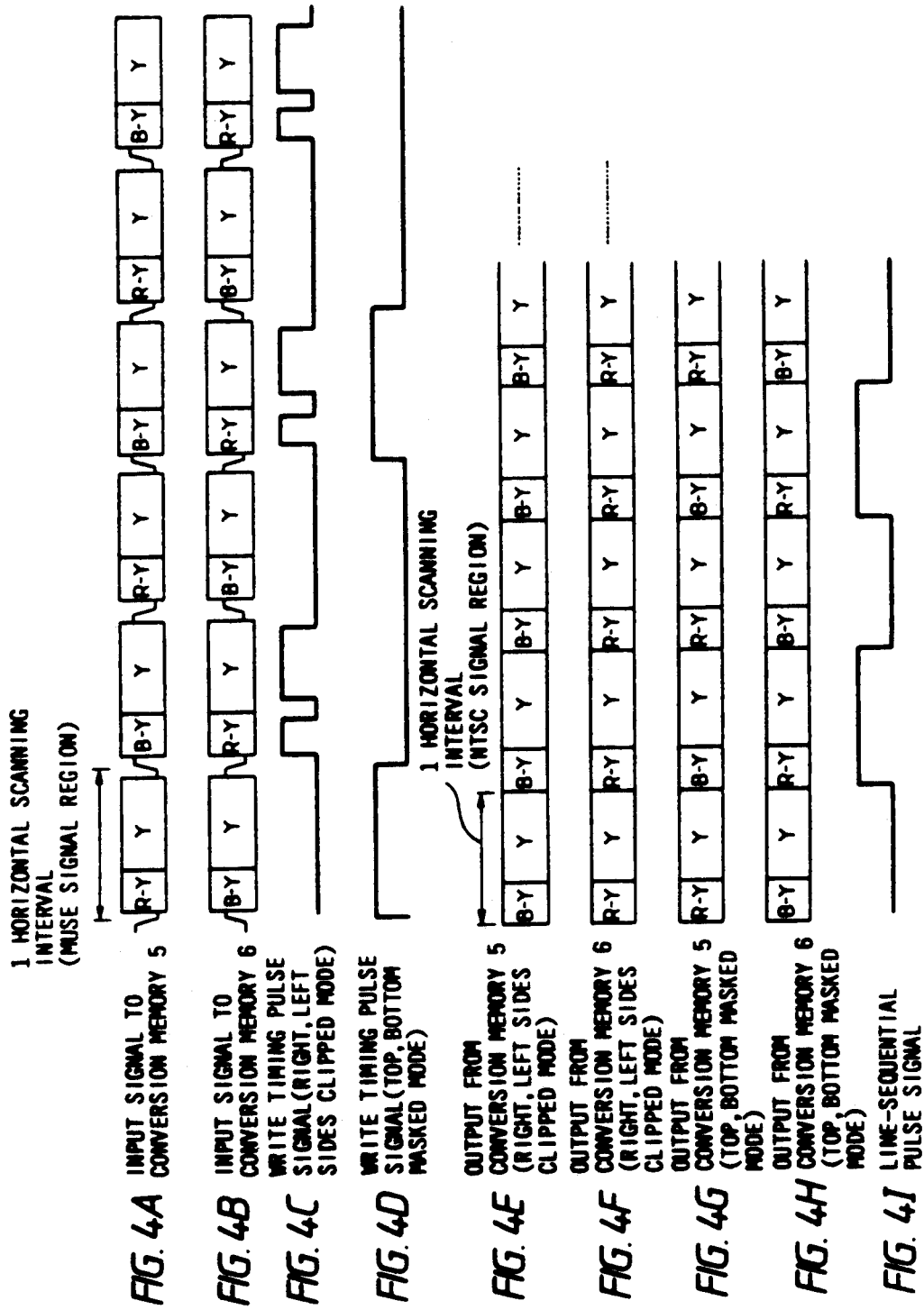
FIGS. 4A-I are timing diagrams for describing the operation of the apparatus of FIG. 2 and also the operation of an embodiment of the present invention.

The operation of this apparatus will be described referring to the timing diagram of FIG. 4. Plots represented in FIGS. 4A-4D relate to the muse signal region (prior to the conversion memories). Those of FIGS. 4E-4I relate to the NTSC signal region (after output from the conversion memories). FIG. 4A illustrates the MUSE signal (after in-field interpolation processing) that is supplied to the conversion memory 5. As indicated, each scan line, consists of a compressed set of C (color signal) samples followed by a set of Y samples corresponding to the pixels of that scan line. The R-Y and B-Y components are contained in respectively alternating scan lines as shown. FIG. 4C shows the waveform of the write timing pulse signal $W_E$ which controls write-in to the conversion memories 5 and 6. This goes to the "H" level, for two successive intervals, once in every two horizontal scanning intervals. During the first of these intervals, a central portion of the B-Y color data (consisting of 128 samples) of a scan line of the MUSE signal is written into the conversion memory 5, while an identical portion of the R-Y color data of the preceding scan line is written into the conversion memory 6. During the second of these two intervals, a central portion of the Y data (consisting of 512 samples) of one scan line is written into the conversion memory 5. At the same time, an identical-size portion of the Y data of the preceding scan line is written into the conversion memory 6. It can thus be understood that during each frame interval of the MUSE signal, respective portions of approximately half of the scan lines of the frame (each scan line consisting of B-Y color samples and Y samples) are written into the conversion memory 5, while respective portions of the other half of the scan lines of the frame (each scan line consisting of R-Y color samples and Y samples) are written into the conversion memory 6. This results from the 1 H delay that is produced between the inputs of the conversion memory 5 and the conversion memory 6, by the 1 H delay element 4.

More precisely, to ensure that scan lines for one frame of the NTSC signal will be read out from memories 5 and 6 for each frame of the MUSE signal, writing into these memories is controlled such that 525 lines (each including 483 effective scan lines) of a frame of the MUSE signal are written into each of memories 5 and 6.

On completion of writing in one frame to the memories 5 and 6, readout of the memory contents to form one frame of the NTSC signal is commenced. The output data flow from these memories is illustrated in FIGS. 4E and 4F respectively, with successive scan lines each consisting only of B-Y color samples and Y samples being produced from the conversion memory 5 and scan lines each consisting only of R-Y color samples and Y samples being produced from the conversion memory 6. Each time that a B-Y color sample is read out from the conversion memory 5, it is selected by the switch 22 to be transferred to the color data expansion circuit 9, while each time that a R-Y color sample is read out from the conversion memory 6, it is selected by the switch 23 to be transferred to the color data expansion circuit 10. Each time that a Y sample is read out from the conversion memory 5, it is selected by the switch 22 to be transferred to the phase shifting circuit 7, while each time that a Y sample is read out from the conversion memory 6, it is selected by the switch 23 to be transferred to an input of the adder 8. These selection operations of the switches 22 and 23 are controlled by switch signals $C_S$ produced from the control and timing signal generating circuit.

The color data expansion circuits 9 and 10 respectively effect expansion of the B-Y and R-Y color information read out from the memories 5 and 6, i.e. to correct for the aforementioned compression of the B-Y and R-Y samples into the horizontal blanking intervals of the MUSE signal, and the expanded B-Y and R-Y samples are supplied from these to respective D/A converters 25 and 26.

Figure 5:
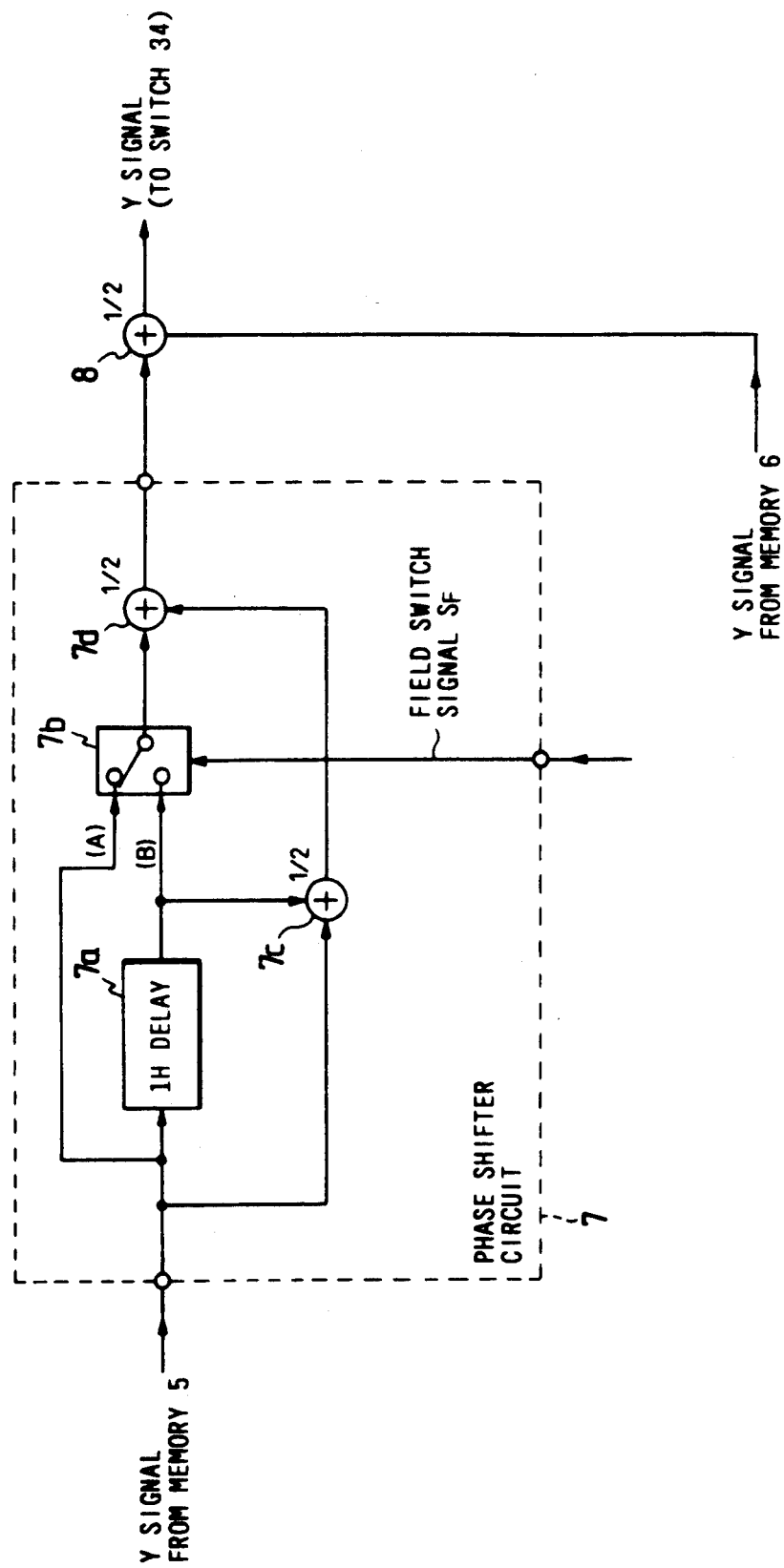
FIG. 5 is a circuit diagram of a phase shifter circuit in the apparatus of FIG. 2.

After each field of the MUSE signal (as outputted from the in-field interpolation circuit 3) has been written into the conversion memory 5 and conversion memory 6 as described above, these memories will respectively contain 525 scan lines from two successive interlaced fields of the MUSE signal. The function of the phase shifting circuit 7 in conjunction with the adder 8 is to act as a vertical filter which combines every three successive lines of a field of the MUSE signal to derive one line of the NTSC signal, functioning such that one NTSC signal scan line is produced for every two MUSE signal lines, and such that the output signal from the adder 8 constitutes two interlaced fields of the NTSC signal for each frame of the MUSE signal. This operation will be described referring to the circuit diagram of FIG. 5 which shows the internal configuration of the phase shifting circuit 7, and the vertical timing diagram of FIG. 6. The phase shifting circuit 7 contains a 1 H delay element 7a, adders 7c and 7d (each of which produces an output value which is one half of the sum of two input values applied thereto, as indicated by the "$\frac{1}{2}$" designation), and a switch 7b. It will be understood that the switch 7b, as well as the switches 22, 23, etc. can in practice each be implemented as a set of logic gates.

The switch 7b is controlled by a field switch signal $S_F$ that is produced from the control and timing signal generating circuit 20, which is at the "H" logic level during one field of each NTSC signal frame and at the "L" level during the other field of the frame. During the first field of each frame of the NTSC signal, switch 7b is set to its "B" position in which the output luminance samples from the conversion memory 5 are transferred through the 1 H delay 7a to an input of the adder 7d, and during the second field of each frame it is set to the "A" position in which the output luminance samples from the conversion memory 5 are transferred directly to the input of the adder 7d. The input and output signals of the 1 H delay 7a are added in the adder 7c and the result transferred to the other input of the adder 7d. The output from the adder 7d is applied to one input of the adder 8, to be added to the Y samples that are read out from the conversion memory 6.

Figures 6A, 6B:
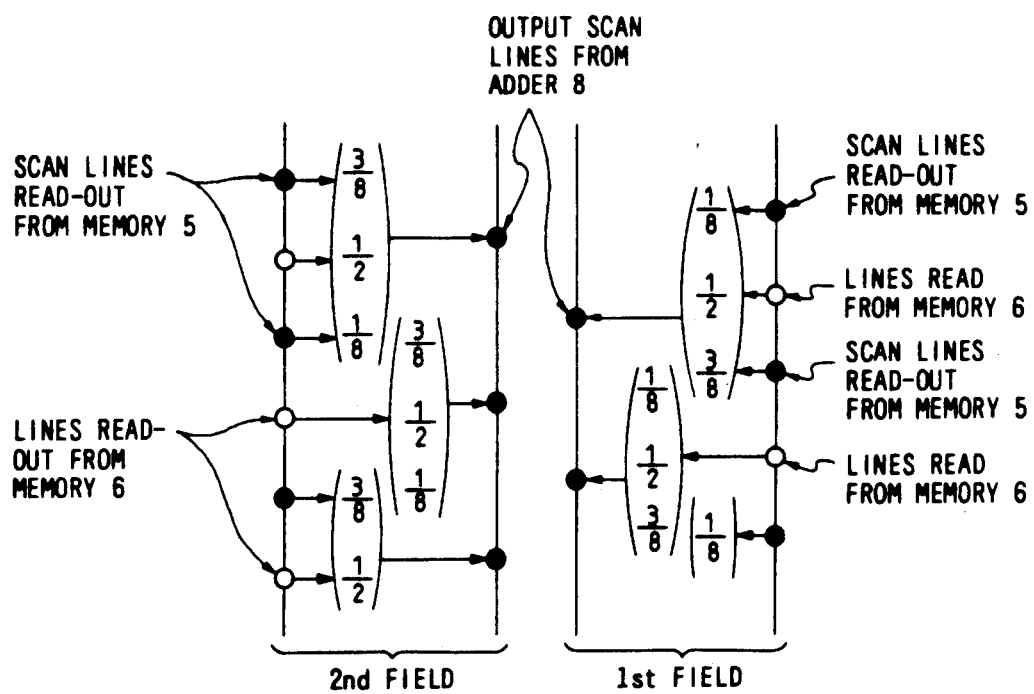
FIGS. 6A and 6B are diagrams for illustrating the operation of the circuit of FIG. 5.

FIG. 6A illustrates the timing relationships during the second field of each frame of the NTSC signal between the scan lines that are read out from the conversion memories 5 and 6 (the scan lines that are read out from memory 5 being indicated as black dots and the scan lines read out from memory 6 as circles), and converted scan lines for the NTSC signal are thereby derived (shown as black dots) as outputs from the adder 8. It can be seen that each output scan line is obtained as a weighted combination of three MUSE scan lines, with the weights being $\frac{1}{8}$, $\frac{1}{2}$ and $\frac{1}{8}$, and that one output (NTSC) scan line is obtained for every two MUSE signal scan lines. FIG. 6B illustrates the corresponding relationships during the first field of each frame of the NTSC signal. It can further be understood that one output scan line is produced from the adder 8 for two scan lines that have been written into the conversion memories 5 and 6, i.e. that the combination of the phase shifting circuit 7 and adder 8 serves to derive an output luminance signal having a number of scan lines per frame that is $\frac{1}{2}$ of the number of scan lines per frame of the MUSE signal (as written into the memories 5 and 6), i.e. 525 lines per frame. It can also be understood that the interlaced relationship between first and second fields of a frame of the MUSE signal is converted into a correct interlaced relationship between the scan lines of first and second fields of the converted luminance signal that is outputted from the adder 8.

The output Y signal from the adder 8 is converted to analog form by the D/A converter 24, and transferred to the NTSC encoder circuit 11. Complete B-Y and R-Y data for each scan line of the NTSC signal are outputted in parallel from the D/A converters 25 and 26 respectively, to the NTSC encoder circuit 11. A composite NTSC color signal is thereby generated by the NTSC encoder circuit 11 from the analog Y, B-Y and R-Y inputs applied thereto, having 525 lines per frame.

Figure 7A:
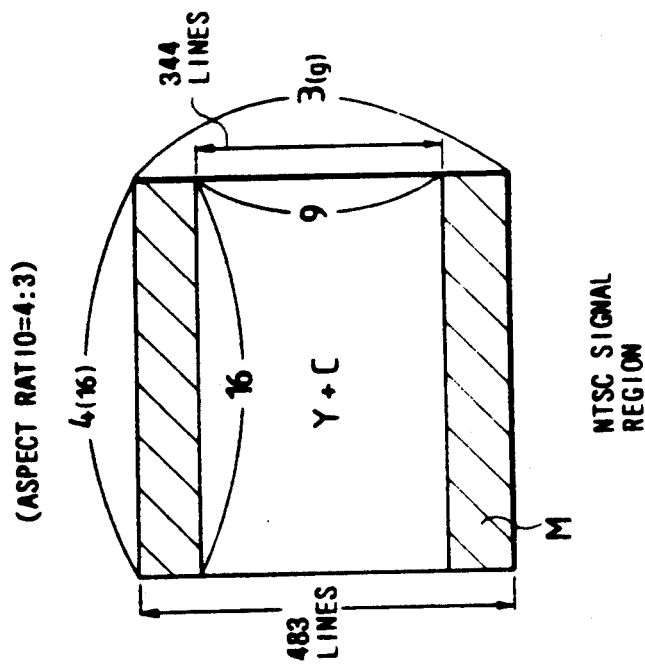
FIGS. 7A and 7B are diagrams for conceptually illustrating a method used in an embodiment of the present invention, for modifying the aspect ratio and number of scan lines per frame of a MUSE television system signal to enable display by an NTSC standard television receiver, by masking of top and bottom portions of the NTSC display.
Figure 7B:
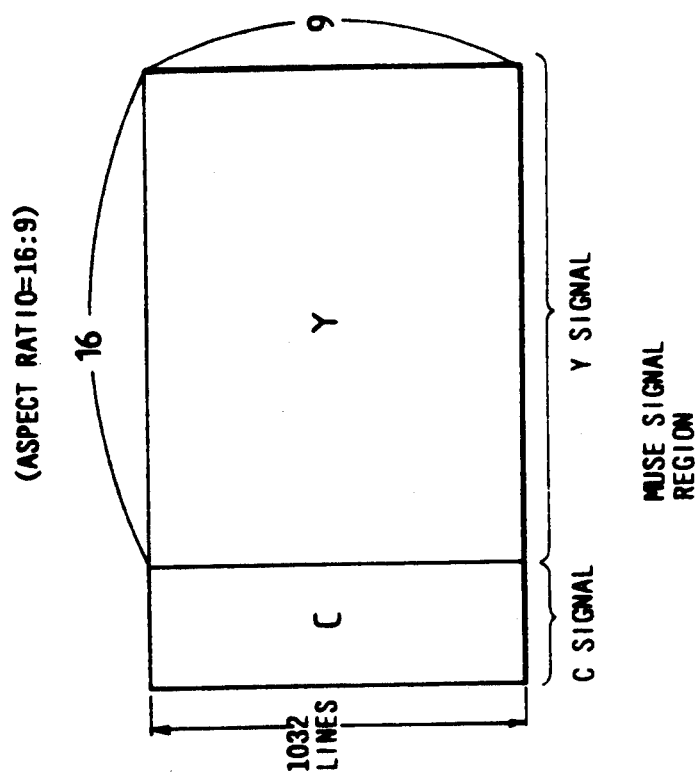

An embodiment of the present invention will now be described, which is implemented as a very simple modification of the circuit of FIG. 2 described above. This embodiment enables selection by the user of a first operating conversion mode in which the apparatus functions in an identical manner to the apparatus of FIG. 2, and a second conversion mode in which the converted NTSC signal that is generated by the apparatus provides a display of the entire MUSE signal television picture. Since the aspect ratio of a MUSE signal is substantially different from that of the display screen of an NTSC television receiver, this can only be achieved by leaving top and bottom portions of the display unused. The apparatus inserts a masking signal into the corresponding portions of the NTSC signal, to thereby establish a predetermined masked condition (i.e. uniform black, white or color) for these unused display screen portions. This operation is conceptually illustrated in FIG. 7. Specifically, FIG. 7A shows the muse signal region and FIG. 7B shows the NTSC signal region. The MUSE signal corresponds to a display format with an aspect ratio of 16:9, with 1032 lines per frame as described above. The non-masked portion of each converted NTSC signal frame in this case also corresponds to a picture aspect ratio of 16:9, with 344 lines per frame. In FIG. 7, the hatched-line portions of the NTSC signal region correspond to the aforementioned masked portions of the display.

Figure 8:
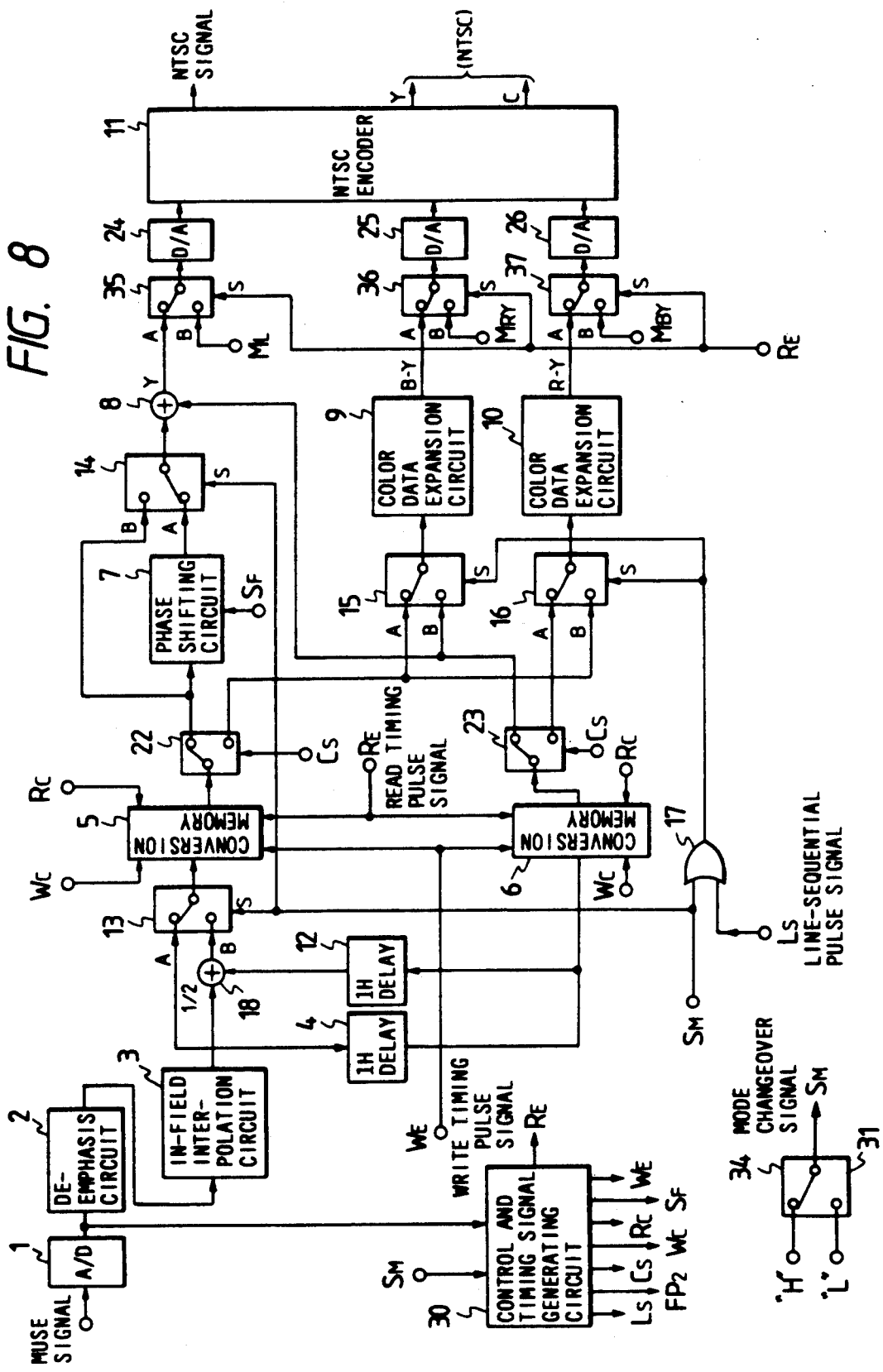
FIG. 8 is a general block diagram of an embodiment of an apparatus according to the present invention for conversion from the MUSE to the NTSC system.

FIG. 8 is a general block diagram of this embodiment of the invention. Various portions of this embodiment are contained in the apparatus of FIG. 2 described above, and further description of these will be omitted. This embodiment differs from the apparatus of FIG. 2 in further including a 1 H delay element 12 and an adder 18, with these being connected such that the output MUSE signal from the in-field interpolation circuit 3 is transferred directly to one input of the adder 18 and via the delay elements 4 and 12 to the other input of adder 18. The combination of elements 4, 12 and 18 functions as an anti-aliasing filter, to prevent aliasing interference being produced in the converted NTSC signal as a result of thinning out of scan lines by a factor of $\frac{1}{3}$, which is executed by this embodiment in deriving the converted NTSC signal. This filter is selected by a switch 13 when the top/bottom masking mode is entered. The embodiment also includes a manually operable switch 34 for producing a mode changeover signal $S_M$ at the "H" level when the apparatus is to operate in the first conversion mode, in which right and left side display portions are clipped, and at the "L" level when operating in the second conversion mode, in which top and bottom portions are masked. The embodiment further includes an OR gate 17 for receiving as inputs the mode changeover signal $S_M$ and a line-sequential signal $L_S$ that is produced from a control and timing signal generating circuit 30, switches 15 and 16 which are controlled by the output signal from the OR gate 17, and a set of switches 35, 36 and 37 which function for inserting mask signals into the Y and C data that are outputted by the apparatus.

The operation of this embodiment in the first conversion mode, with the mode changeover signal $S_M$ at the "H" level (right and left side clipping) is identical to that of the apparatus of FIG. 2 described above, and further description of this will be omitted. The operation in the second conversion mode, with the mode changeover signal $S_M$ at the "L" level (top and bottom portion masking, as illustrated in FIG. 7) is as follows. In this mode, the output of the aforementioned anti-aliasing filter is selected to be transferred to the conversion memory 5. The control and timing signal generating circuit 30 responds to the "L" state of the mode changeover signal $S_M$ by generating the write timing pulse signal $W_E$ as shown in FIG. 4D, i.e. with the write timing pulse signal $W_E$ going to the "H" level for an entire horizontal scanning interval of the MUSE signal during one out of every three scan lines of the MUSE signal. As a result, only one out of every three scan lines of the MUSE signal (from the output of adder 18) is written into conversion memory 5 while simultaneously one out of every three scan lines of the MUSE signal (from the 1 H delay 4) is written into the memory 6. Thus during one frame interval of the MUSE signal, ⅓ of the scan lines of that frame (more exactly, ⅓ of the effective scan lines, as described hereinafter) will be written into each of the memories 5 and 6. As a result, the scan lines will be read out of the conversion memories 5 and 6 in the sequences shown in FIGS. 4G and 4H respectively. As shown, scan lines containing R-Y color data alternate with scan lines containing B-Y color data, in the outputs from each of the memories 5 and 6, with the outputs from these memories being mutually offset by one horizontal scanning interval.

The waveform of the line-sequential signal $L_S$, which is generated by the control and timing signal generating circuit 30, is shown in FIG. 4I. This goes to the "H" level once in every two horizontal scanning intervals of the NTSC signal. So long as the mode changeover signal $S_M$ is at the "H" level (i.e. during operation in the first conversion mode, with right and left side clipping), the output from the OR gate 17 is held at the "H" level, whereby both of the switches 15 and 16 (and also switch 13) are held at their "A" positions. Thus, the identical condition to that of the apparatus of FIG. 2 is established. When signal $S_M$ is at the "L" level (i.e. in the second conversion mode, with top and bottom masking of the picture), the level of the output from the OR gate 17 varies in accordance with the level of the line-sequential signal $L_S$. In this case, each time the line-sequential signal $L_S$ is at the "L" level, each of the switches 15, 16 is set to the "B" position, in which the color signal output from the memory 6 is supplied to the color data expansion circuit 9 and the color signal output from the memory 5 is applied to the color data expansion circuit 10. It can thus be understood from FIGS. 4G, 4H and 4I that this will result in the correct sequence of B-Y and R-Y data of successive scan lines being supplied to the color data expansion circuit 9 and color data expansion circuit 10 respectively, with compressed B-Y samples being inputted only to the color data expansion circuit 9 and R-Y samples only to the color data expansion circuit 10.

In this second conversion mode, the mode changeover signal $S_M$ causes the switch 14 to be held at its "B" position, so that the phase shifting circuit 7 is by-passed. As a result, each scan line that is outputted from the adder 8 is a combination of the luminance data of one scan line from the conversion memory 5 and one scan line from the conversion memory 6. Thus, the number of scan lines that are outputted from the adder 8 in one frame of the NTSC signal will be ⅓ of the number of effective scan lines of the MUSE signal in one frame.

Read operation of each of the conversion memories 5 and 6 is controlled by a read timing pulse signal Re which is produced from the control and timing signal generating circuit 30, with reading being enabled and inhibited when that signal is at the "H" and the "L" level respectively. In the first conversion mode, read operation is continuously enabled. In the second conversion mode, read operation is enabled except during top and bottom masking intervals. When the read timing pulse signal Re is held at the "H" level, each of the switches 35, 36 and 37 is held at the "A" position thereby establishing the same condition as for the apparatus of FIG. 2. During each interval of the converted NTSC signal in which a masking signal is inserted, the read timing pulse signal Re is at the "L" level. Each time that signal Re goes to the "L" level, each of the switches 35, 36, 37 is set to the "B" position, whereby a fixed-value masking signal $M_{-L}$ is transferred to the D/A converter 24, and similarly a masking signal $M_{RY}$ is transferred to the D/A converter 25, and a masking signal $M_{BY}$ is transferred to the D/A converter 26. These masking signals (which can be fixed digital values) determine the condition of the portion of the NTSC picture that is masked (i.e. color or degree of lightness/darkness).

Figure 9:
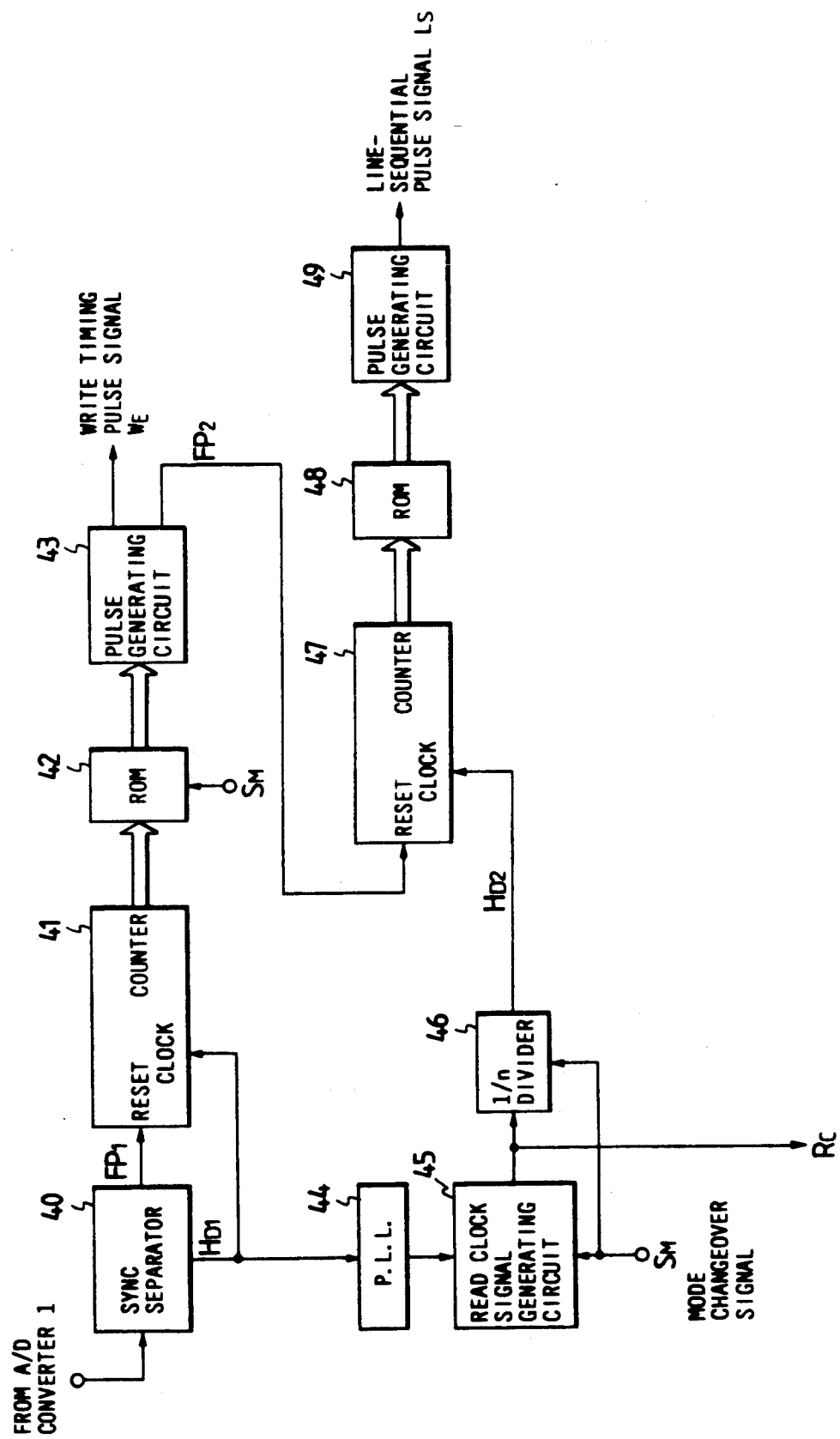
FIG. 9 is a partial block diagram of a timing and control signal generating circuit in the apparatus of FIG. 8.

FIG. 9 is a block diagram showing components of the control and timing signal generating circuit 30 which serve to generate the write timing pulse signal $W_E$, line-sequential signal $L_S$ and write signal $R_C$. The output digital samples from the A/D converter 1 are inputted to a synchronizing signal separator circuit 40, which derives a horizontal synchronizing pulse signal $HD_1$ and frame pulse signal $FP_1$ from the horizontal and frame synchronizing signals of the MUSE signal. The frame pulses $FP_1$ are applied to a reset input terminal of a counter 41, while the horizontal synchronizing pulses $HD_1$ are applied to the clock input terminal of that counter. The counter 41 thereby counts up the number of scan lines in each frame of the MUSE signal, i.e. up to 1125, and the successive count values of the counter are applied to address inputs of a ROM 42. The ROM 42 outputs specific values in response to respective count values, and these outputs from the ROM are supplied to a pulse generating circuit 43. The pulse generating circuit 43 thereby generates the write timing pulse signal $W_E$ shown in FIG. 4C or 4D. Specifically, when the mode changeover signal $S_M$ is at the "H" level, a first region of the ROM 42 is addressed by the output values from the counter 41, whereby the write timing pulse signal $W_E$ is generated with the waveform shown in FIG. 4C. When the mode changeover signal $S_M$ is at the "L" level, a second region of the ROM 42 is addressed, whereby the write timing pulse signal $W_E$ is generated with the waveform shown in FIG. 4D. On completion of writing one frame of the MUSE signal into the memories 5 and 6, a frame pulse $FP_2$ is generated from the pulse generating circuit 43, and applied to the reset input terminal of a second counter circuit 47. The horizontal synchronizing pulses $HD_1$ from the synchronizing signal separator circuit 40 are also inputted to a PLL 44, which generates an output signal that is phase-locked with $HD_1$. The PLL output signal is inputted to a read clock signal generating circuit 45, which produces the read clock signal $R_C$. The read clock signal generating circuit 45 is controlled by the mode changeover signal $S_M$ to produce $R_C$ at a first or a second frequency value, in accordance with the state of $S_M$. The read clock signal $R_C$ is inputted to a 1/n divider circuit 46, which is also controlled by the mode changeover signal $S_M$, to divide by either a first or a second division ratio (1/n) in accordance with the state of $S_M$. Horizontal sync pulses $HD_2$ for the NTSC signal are thereby generated from the 1/n divider circuit 46, and applied to the clock input terminal of the counter circuit 47. The count values of the counter circuit 47 are applied to address inputs of a ROM 48, and the output values produced from ROM 48 are supplied to a pulse generating circuit 49 which generates the line-sequential signal $L_S$, having the waveform shown in FIG. 4I.

The write clock signal $W_C$ can be generated by a fixed-frequency generating circuit (not shown) that receives the output signal from the PLL 44.

Figure 10A:
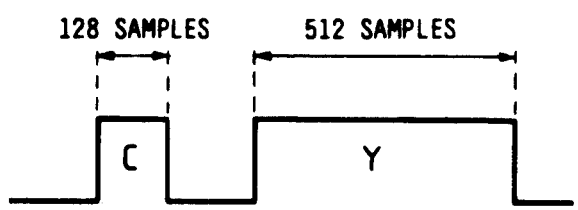
FIGS. 10A and 10B are diagrams for assistance in describing how a read clock frequency is determined in the embodiment of FIG. 8.
Figure 10B:
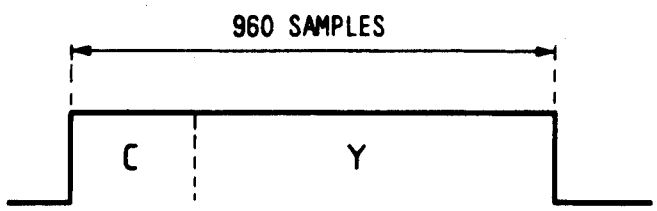

The frequency of the read clock signal $R_C$, which determines the aspect ratio of the converted NTSC signal produced by the apparatus, is established as follows. FIG. 10A illustrates the "H" level condition of the write timing pulse signal $W_E$ during a horizontal scanning interval of the MUSE signal, during operation in the first conversion mode (right and left sides of picture clipped), while FIG. 10B is a corresponding diagram for the second conversion mode (top and bottom picture masking). One scan line of the MUSE signal contains a total of 960 sample values (the Y samples corresponding to respective pixels), with $\frac{1}{4}$ of these being C samples, i.e. R-Y or B-Y samples, depending on the particular scan line. These C samples are compressed into the horizontal blanking interval of the scan line. In the first conversion mode, to effect clipping of the right and left sides of the picture as described hereinabove, only 128 of the C samples and 512 of the Y samples in each effective scan line of the MUSE signal are selected to be written into the conversion memories 5 and 6, by the write timing pulse signal $W_E$, as shown in FIG. 10A. In the second conversion mode, the entire 960 samples in one MUSE signal scan line are selected to be written in, as indicated in FIG. 10B. Thus, in the case of the first conversion mode, a total of $(128+512)=640$ samples must be written into the each of memories 5 and 6. Since the frame frequency is 30 Hz and there are 525 scan lines per frame in the NTSC signal, the output sample frequency from each of the conversion memories 5 and 6 (i.e. the read clock signal frequency) must be equal to $(640 \times 525 \times 30) = 10.08$ MHz. In the case of the second conversion mode, the read clock signal frequency must be equal to $(960 \times 525 \times 30) = 15.12$ MHz. These respective values of frequency for the read clock signal $R_C$ are selectively outputted by the read clock signal generating circuit 45 in FIG. 9 in accordance with the state of the mode changeover signal $S_M$ that is applied as a control signal thereto.

Since one pulse of the horizontal synchronizing signal $HD_2$ must be produced for each scan line of the converted NTSC signal, and 640 samples per scan line are read out from each of the conversion memories 5 and 6 in each frame interval of the NTSC signal in the first conversion mode, the 1/n divider circuit 46 must execute division by a factor of 1/640 (i.e. $n=640$) in the first conversion mode. Similarly, n must be made equal to 960 during operation in the second conversion mode. These values of division ratio of the counter circuit 47 are determined in accordance with the state of the mc, which is applied as a control signal thereto.

In the case of the first conversion mode described above, each of the conversion memories 5 and 6 can operate in continuous "read enabled" operation. In that case, since as described referring to Table 1 above a total of 483 effective scan lines are extracted from each frame of the MUSE signal to become effective scan lines of the converted NTSC signal (where "effective" signifies containing picture information, as previously defined), and since there must be 525 lines per frame in the NTSC signal, it is only necessary to ensure that $(525-483)=42$ "non-effective" scan lines of each frame of the MUSE signal are written into the memories 5 and 6 together with the 483 effective scan lines of the frame. More specifically, 241.5 effective scan lines for one field of the NTSC signal are written into the memories, then 21 non-effective scan lines then 241.5 effective scan lines, and so on. This can readily be arranged by suitably determining the waveform of the write timing signal $W_E$.

However in the case of the second conversion memory, it is not possible to hold the conversion memories 5 and 6 in "continuously enabled" operation. This is due to the fact that in this case there is an insufficient number of non-effective lines (i.e. 46 scan lines) between each set of effective scan lines, to fill the masked top and bottom portions of the NTSC picture. In the second conversion memory, 90.5 non-effective scan lines must occur between the effective scan lines of one field and the start of the effective scan lines of the succeeding field. This is because $\frac{1}{2}$ of the effective scan lines of one frame of the MUSE signal (i.e. 344 scan lines) appear in each frame of the converted NTSC signal, so that a total of $(525-344)=181$ non-effective scan lines must be inserted into each frame of the NTSC signal. It is therefore necessary to periodically halt the memory read operation for fixed intervals, to allow time for inserting the necessary sets of scan lines corresponding to the masked picture regions into the converted NTSC signal.

Figure 11:
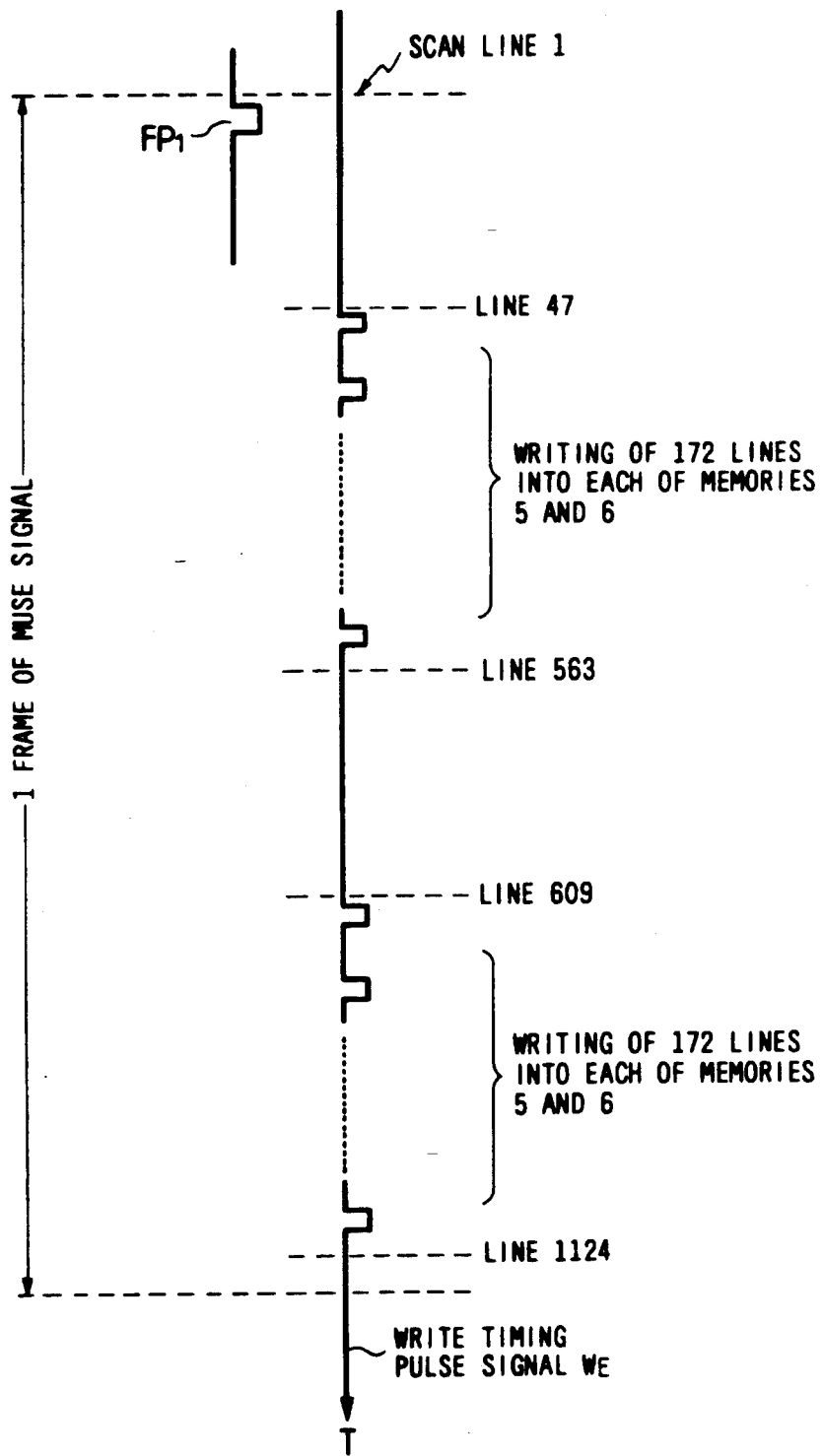
FIG. 11 is a diagram for describing the method of writing into conversion memories in the embodiment of FIG. 8.
Figure 12:
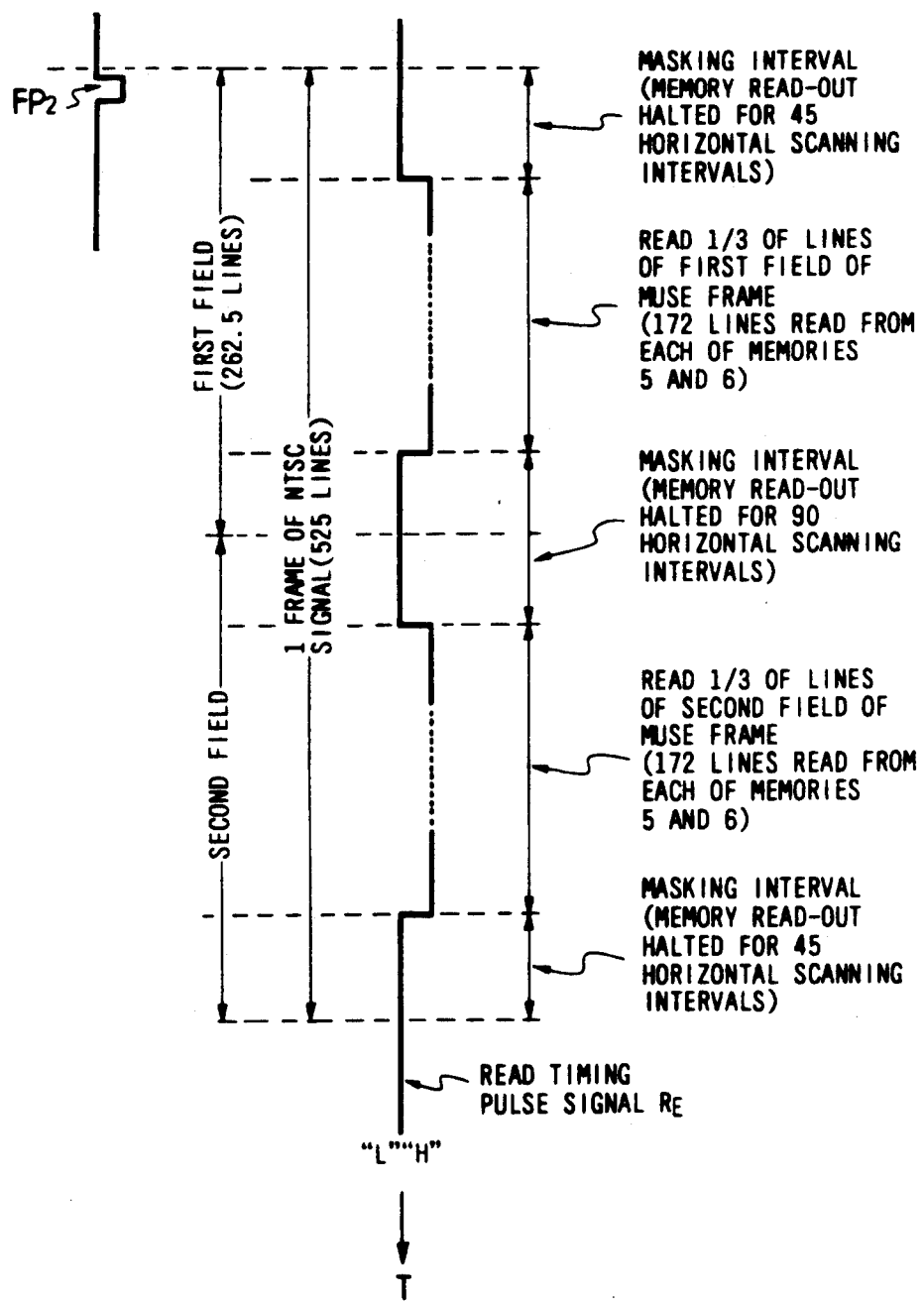
FIG. 12 is a diagram for describing the method of reading out from conversion memories in the embodiment of FIG. 8

An example of how this can be done is illustrated in FIGS. 11 and 12. FIG. 11 is a timing diagram showing the memory write operation. In this example, only effective scan lines of the MUSE signal are written into the memories 5 and 6, i.e. beginning from line 47 in the first field of a MUSE signal frame, the write timing pulse signal $W_E$ goes to the "H" level once in every four scan lines, until line 563, and this is repeated during lines 609 to 1124 of the second field of the frame. In this way, 172 scan lines are written into each of the memories 5 and 6 during each field of the MUSE signal.

The corresponding memory read operation is shown in the timing diagram of FIG. 12. At the start of each frame of the converted NTSC signal, following an $FP_2$ frame pulse, read operation of both of the conversion memories 5 and 6 is inhibited for an interval equal to 45 scan line intervals of the NTSC signal (corresponding to an upper masked region of 45 lines). Read operation is then enabled during 172 lines, to read out the aforementioned 172 lines extracted from a first field of a MUSE frame. Read operation is then inhibited during 90 lines, corresponding to 45 lines of the lower masked region, then 45 lines of the upper masked region, read operation is then again enabled to read out the 172 lines of the next field, and so on.

It will be apparent that insertion of horizontal synchronizing signal components (i.e. generated by the timing and control signal generating circuit 30) into the scan lines of the masked regions can be readily accomplished, so that description of this is omitted.

It can thus be understood that the present invention enables an apparatus for conversion from the MUSE to the NTSC system to be configured, which enables selection of either a mode in which a received MUSE signal picture is displayed by an NTSC standard television receiver with side portions of the picture clipped to provide the standard NTSC aspect ratio, or a mode in which the entire MUSE signal is displayed by the NTSC receiver, with masking of upper and lower display regions. It can further be understood that such a conversion apparatus can be implemented by a simple modification of an apparatus which can provide only the side region clipping mode of operation, and that the apparatus can have a simple overall circuit configuration.

What is claimed is:

1. An apparatus for executing conversion processing of a MUSE (Multiple Sub-Nyquist Sampling Encoding)

video signal to obtain a converted NTSC (National Television Systems Committee) video signal, comprising:

selector means actuatable for establishing a first mode and a second mode of operation of said apparatus;

means for executing said conversion processing in said first mode, comprising means for removing fixed-size portions of each scan line of said MUSE signal corresponding to left and right sides of a video picture represented by said MUSE signal and means for thinning out the resulting scan lines of said MUSE signal by a factor of ½ to thereby derive from each frame of said MUSE signal all of the scan lines of a corresponding frame of said converted NTSC signal, whereby said NTSC signal represents said MUSE signal picture with said left and right portions removed and having an NTSC aspect ratio of 4:3; and means for executing said conversion processing in said second mode, comprising means for thinning out the scan lines of said MUSE signal by a factor of ⅓ to thereby obtain from the scan lines of each frame of said NTSC signal a fixed number of the scan lines of a corresponding frame of said converted NTSC signal, and means for generating the remaining scan lines of said corresponding frame by utilizing masking signals, whereby said NTSC signal represents a picture having said NTSC aspect ratio, said picture being formed of said MUSE signal picture having an aspect ratio of 16:9 sandwiched between upper and lower mask regions.

2. An apparatus according to claim 1, in which said conversion processing means comprise first and second conversion memories and means for transferring said MUSE signal to said second conversion memory while delaying the signal by an amount equal to one scan line interval and in which, in said first mode, said means for removing scan line portions corresponding to left and right side picture portions comprise means for controlling writing of successive pairs of scan lines of said MUSE signal simultaneously into said first and second conversion memories respectively, with said scan line portions excluded, and said means for thinning out by a factor of ½ comprise means for simultaneously reading out, from said first and second conversion memories respectively, successive pairs of scan lines of said MUSE signal having said portions excluded, and circuit means for combining each of successive fixed pluralities of said scan lines to obtain scan lines of said converted NTSC signal, with one scan line of said converted NTSC signal being derived for each odd and even-numbered scan line pair of said MUSE signal;

and in which, in said second mode, said means for thinning out by a factor of ⅓ comprise means for delaying the MUSE signal by one horizontal scanning interval to obtain a delayed signal, means for writing one out of every three successive scan lines of said MUSE signal directly into said first conversion memory while simultaneously writing one out of every three successive scan lines of said delayed signal into said second conversion memory, and means for thereafter reading out said scan lines simultaneously from said first and second scan lines and for combining each pair of scan lines thus simultaneously read out to obtain one scan line of said converted NTSC signal.

3. An apparatus according to claim 2, and further comprising:

first color data selection means for separating compressed color data from respective scan lines that are read out from said first conversion memory and second color data selection means for separating compressed B-Y and R-Y color data from respective scan lines that are read out from said second conversion memory;

a first color data expansion circuit for executing time axis expansion of said B-Y color data and a second color data expansion circuit for executing time axis expansion of said R-Y color data;

color data changeover means controlled for alternately establishing during successive scan line intervals a first condition in which color data separated by said first and second color data selection means are respectively transferred to said first and second color data expansion circuits and a second condition in which color data separated by said second and first color data selection means are respectively transferred to said first and second color data expansion circuits; and encoder means for combining output color data from said color data expansion circuits with luminance data read out from said memory, to obtain an NTSC color television signal.

* * * * *